April 7, 1964     W. E. LANHAM     3,127,980
CHAIN LINK CONVEYOR BELT
Filed May 11, 1961

INVENTOR.
WILLIAM E. LANHAM
BY
Curtis, Morris & Safford
ATTORNEYS

United States Patent Office

3,127,980
Patented Apr. 7, 1964

3,127,980
CHAIN LINK CONVEYOR BELT
William E. Lanham, Decatur, Ga., assignor to Apache Belt Company, Inc., Atlanta, Ga., a corporation of Georgia
Filed May 11, 1961, Ser. No. 109,291
2 Claims. (Cl. 198—195)

The present invention relates to chains and more particularly to improved chain links adapted for conveyor belts for bakery products, but not necessarily limited to such use.

Conveyors for bakery products, such as bread, should be constructed to prevent the accumulation of crumbs, prevent contamination of the products being conveyed and provide a uniform drive. A conveyor described and claimed in my copending application for Letters Patent, Serial No. 497,521, filed March 29, 1955, now abandoned, entitled Conveyor Belt has been found to meet these requirements to an exceptional degree. This conveyor comprises spaced rods extending transversely of its direction of movement with the ends of adjacent rods connected by flat metal links confined in peripheral grooves in the rods. In a preferred form, the conveyor has spaced rows of links at each end of the rods to provide a sprocket race between adjacent rows for engagement by the teeth of driving and guiding sprockets.

While this conveyor operates satisfactorily and has been used extensively, the assembly of the links and rods in a continuous conveyor belt and the deformation of the assembled links requires considerable time, labor and equipment, and the lubrication of the articulated links and rods to reduce wear presents a considerable problem. Any lubricant applied to the rods and links is apt to contaminate the articles being conveyed, and especially so when the conveyor is used for conveying bakery products.

One of the objects of the present invention is to provide an improved link construction to adapt it to be snapped onto other links to form a continuous chain for any desired purpose.

Another object is to provide an improved conveyor of spaced rods connected by the improved chain links of the present invention to reduce the time and labor required to assemble the parts, reduce the wear between the links and rods without lubrication and frictionally hold the rods in assembled relation.

Still another object is to provide an improved chain link which is of a simple, compact and lightweight construction, economical to manufacture, reliable in operation and one which facilitates repair and replacement of links and rods.

These and other objects will become more apparent from the following description and drawing in which like reference characters denote like parts throughout the several views. It is to be expressly understood, however, that the drawing is for the purpose of illustration only and is not a definition of the limits of the invention, reference being had for this purpose to the appended claims.

Figure 3:
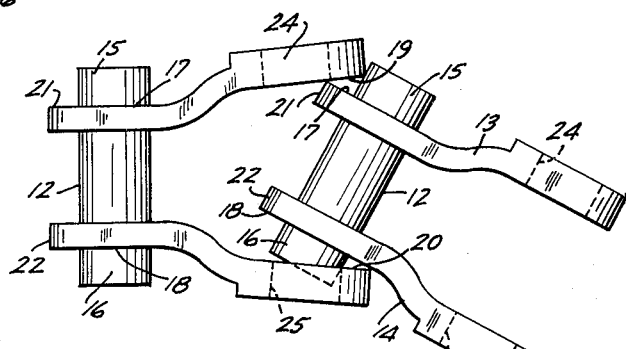
Figure 4:
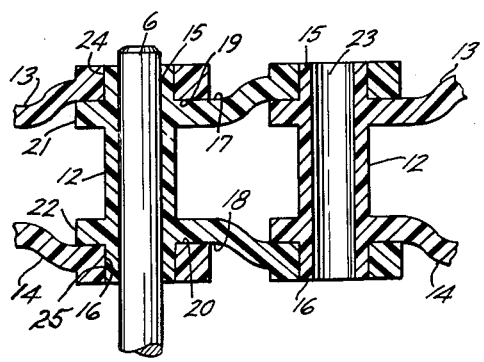

FIGURE 3 is a plan view of a pair of the links to show the manner in which the links are connected by snapping the end of one over the opposite end of another to connect the links in a chain; and FIGURE 4 is a sectional plan view showing the manner in which the links are interlocked for articulation, one on the other, and the hollow form of the pin and projecting bosses to receive and frictionally engage the end of a rod.

Referring now to the drawing, the chain link of the present invention is shown applied to a conveyor belt of the type used in bakeries to convey bakery products, such as bread. It is to be understood, however, that while the invention relates, at least in part, to an improved conveyor belt, it is also adapted for the same uses as conventional roller chains.

Figure 1:
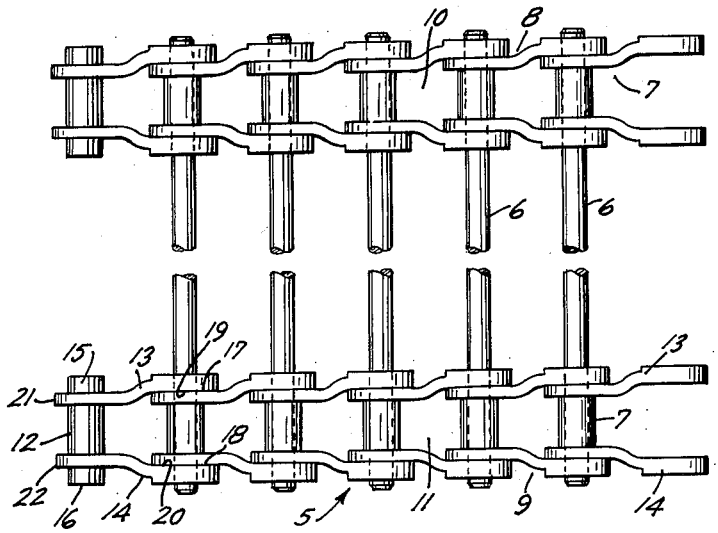
FIGURE 1 is a plan view of a conveyor belt incorporating the improved chain link construction of the present invention.
Figure 2:
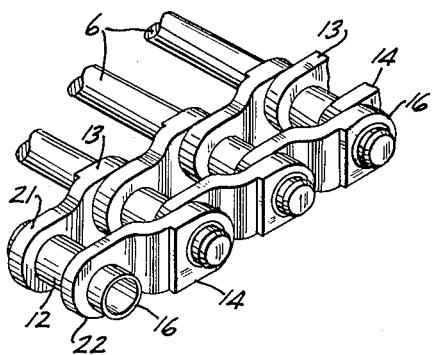
FIGURE 2 is a perspective view of several connected links to show the unitary U-shaped form of each link having a connecting pin and spaced arms with extensions of the pin forming laterally projecting bosses.

As shown in FIGURE 1, the conveyor belt 5 comprises spaced rods 6 extending between corresponding links 7 of spaced chains 8 and 9. The ends of adjacent rods 6 project through the links 7 which also provide sprocket races 10 and 11 at each end of the rods to accommodate the teeth of driving the sprocket wheels, not shown. As thus far described, the conveyor 5 is substantially the same as that shown and described in my copending application Serial No. 497,521, referred to above. Such a conveyor is particularly adapted for use in bakeries because of its self-cleaning characteristics which permits crumbs and the like to fall from the conveyor between the spaced rods. The construction also provides the raceways 10 and 11 at opposite sides of the conveyor for driving or guiding sprockets, the same as in my copending application.

In accordance with the present invention each chain 8 and 9 comprises a plurality of resilient links 7 of generally U-shaped form to adapt them to be snapped one over the other in a continuous chain of articulated links. Such a chain of connected links may be used for any of the purposes of a roller chain and in the illustrated embodiment, a pair of the chains mount the ends of the spaced rods in a novel manner to provide an improved conveyor 5.

Each U-shaped link 7 comprises a pin 12, spaced arms 13 and 14 projecting from one side of the pin and bosses 15 and 16 projecting laterally from opposite side of the link. As shown in the drawing, each arm 13 and 14 is offset laterally intermediate its ends a distance equal to the thickness of the arm so that the inside faces 17 or 18 of the outer ends of the arms 13 and 14 are aligned with the outside faces 19 and 20 of the arms adjacent the pin 12, and the bosses 15 and 16 project laterally a distance equal to the offset in the arms, or, in other words, the thickness of the arm.

Arms 13 and 14, as shown, have a greater width than the diameter of the sleeve 12 and extensions of the arms around the periphery of the sleeve form flanges 21 and 22 from which the bosses 15 and 16 project laterally. In the illustrated embodiment, the pin 12 and bosses 15 and 16 of each link 7 are aligned and have an axial bore 23 to form a sleeve of a size to provide a close fit with and frictionally enage the outer ends of a rod 6. However, when the links are used to form a chain 8 or 9 for other uses, such as the transmission of power, a metal pin may be inserted in the sleeve and bosses, or the sleeve and bosses may be molded as a solid pin. The outer ends of the arms 13 and 14 also are provided with cylindrical holes 24 and 25 of a diameter to fit the outer peripheries of the laterally projecting cylindrical bosses 15 and 16.

The links 7 may be composed of any suitable resilient material in a one-piece structure which is sufficiently elastic to adapt the ends of the arms 13 and 14 to be snapped over the bosses 15 and 16 of an adjacent link 7 to connect the links in a continuous chain. Such materials may comprise a rigid plastic, such as nylon or phenolic resins, and even some of the newer type investment casted spring metals. Preferably, the links are composed of an acetal resin manufactured by the Du Pont Company under the trade name "Delrin." This material has a high tensile strength and a very low coefficient of friction which eliminates any necessity for lubricants. Because of its low coefficient of friction it will last from two to four times as long as a metal part, due to wear, has very limited warpage or discoloration and costs less than half as much as, for example, stainless steel parts used in bakery equipment. In addition, the material has a high degree of resilience so that its arms 13 and 14 will spring back to their original shape after being spread sufficiently to snap over the bosses 15 and 16 of an adjacent link without any permanent deformation. The plastic links 7 may be injection molded in their final shape to form the hollow sleeve 12, arms 13 and 14, bosses 15 and 16 and openings 23, 24 and 25 in a single operation to provied an integral one-piece structure.

Due to the U-shaped form of the new links 7 and the spring material of which they are composed, a plurality of the links may be connected to each other in a continuous chain by merely snapping the ends of the arms 13 and 14 of each link over the bosses 15 and 16 of an adjacent link, as shown in FIGURE 3. By hooking one of the bosses 16 of one link 7 at the edge of cylindrical opening 25 in the arm 14 of another link and then springing the other arm 13 of the other link away from the arm 14, the adjacent links may be snapped one over the other in interlocking relation. When a series of the links 7 are connected to each other, as shown in FIGURE 4, the inside faces 19 and 20 of the arms 13 and 14 of one link bear against the outside faces 17 and 18 of the flanges 21 and 22 on the adjacent link with the bosses 15 and 16 of the latter link projecting through the cylindrical openings 24 and 25 in the arms of the first link. The arms 13 and 14 of one link 7 then rotate freely on the bosses 15 and 16 of the other link, due to the low coefficient of friction of the material, and the sleeve 12 of each link frictionally engages the end of a rod 6 for rotation therewith as a unit.

The rods 6 may be composed of stainless steel, aluminum, carbon steel or a rigid plastic of the same or a different kind as the links. As stated above, the ends of the rods frictionally engage the sleeves 12 of the links 7 with a pressed fit so that the links hold the rods 6 in the position in which they are initially mounted so that no locking means is required to retain the rods in the chains 8 and 9. In other words, after the rods 6 have been assembled in the sleeves 12 of the corresponding links 7 of the spaced chains 8 and 9, the rods remain in the same relative fixed position at all times during operation of the conveyor, and all rocking movement occurs between the arms 13, 14 and bosses 15 and 16 of adjacent links and not between the links and rods.

Each chain 8 and 9 is formed by assembling a plurality of the links 7 by snapping arms 13 and 14 of one link over the bosses 15 and 16 of an adjacent link until a chain of the desired length has been formed. This chain can then be used for any desired purpose, such as a power drive, or the like. The series of spaced overlapping arms 13 and 14 of the plurality of connected links 7 form a race 10 or 11 between the spaced arms for accommodating the teeth of a driving or driven sprocket wheel. Thus, a driving sprocket operates between the spaced arms 13 and 14 of each link 7 to drive the chain. Sleeves 12 between the spaced arms 13 or 14 constitute spaced pins for driving engagement with the teeth of the sprocket wheel.

When the links 7 are to be used in a conveyor 5 of the type illustrated in FIGURE 1, a pair of chains 8 and 9 of connected links are assembled. The opposite ends of the rods 6 then are pressed into the cylindrical bores 25 in sleeves 12 of corresponding links 7 in the pair of chains. As the ends of the rods 6 have a much closer fit with the links 7 than the arms 13 and 14 of the links have with the bosses 15 and 16, a rod and pair of links rock as a unit relative to the next rod and pair of links during operation, and the sprocket teeth bear on the exterior of the sleeve 12 of each link 7 in the sprocket races 10 and 11 which have a low coefficient of friction and avoid the necessity of a lubricant. When the conveyor 5 is to be used in straight runs only, the links 7 of each chain 8 and 9 are of equal length, the openings 24 and 25 in arms 13 and 14 are of cylindrical shape and have a running fit with the outer periphery of bosses 15 and 16. Thus, the improved links 7 provide a conveyor 5 with very tight connections to limit the lateral movement of the chain. It will be understood, however, that if the chain is to move in a circular course in a single plane the chains 8 and 9 may be composed of links of different lengths, the chain 8 on one side may have a single link between rods and chain 9 provided with a pair of links between rods, or the openings 24 and 25 in the arms 13 and 14 may be in the form of oval shaped slots. Such oval slots would have a width corresponding to the diameter of the bosses 15 and 16 and a length to permit the rods 6 to spread radially relative to each other to the desired degree to accommodate circular or curved paths in a horizontal plane. During such operation, the resiliency of the arms 13 and 14 would tend to maintain the chains 8 and 9 in a parallel arrangement while the conveyor is moving in a straight course, but the arms would flex relative to each other to permit the links 7 to tilt or incline for movement in a circular path. Thus, the links 7 of the present invention are particularly adapted for a conveyor used in a bakery for transporting bakery products. Some of the advantages flowing from the improved link are the ease of assembly, uniformity of the links in a unitary structure formed by high speed injecting molding, simplicity of design, elimination of any lubricants to avoid contamination of food products, a construction having a low bacteria count, due to the smooth surface of the links, and a construction which tends to prevent links from breaking or falling off and dropping into the food products.

It will now be observed that the present invention provides an improved link construction of a molded plastic to adapt a plurality of the links to be assembled by snapping one over the other to form a continuous chain for any desired purpose. It will also be observed that the present invention provides an improved conveyor of spaced rods connected by chain links which reduces the time and labor required to assemble the parts and reduces the wear between the links and rods without lubricants. It will also be observed that the present invention provides an improved chain link which is of simple and compact construction, economical to manufacture and one which is reliable in operation in a chain of links.

While a single embodiment of the invention is herein illustrated and described it will be understood that changes may be made in the construction and arrangement of elements without departing from the spirit or scope of the invention. Therefore, without limitation in this respect, the invention is defined by the following claims:

1. A conveyor belt comprising a plurality of spaced parallel rods each having a single link at each end for articulate connection with corresponding links on adjacent rods whereby articulation occurs between links only, each of said single links at each end of each rod comprising a sleeve surrounding the rod with a press fit, spaced arms projecting from one side of said sleeve with free ends offset a distance equal to the thickness thereof, cylindrical bosses projecting outwardly from the sides of the arms as extensions of the sleeve, and the offset ends of the arms having holes through which the bosses of an adjacent link project with a sliding fit whereby each rod and the links at its ends move as a unit relative to an adjacent rod and its links with the links on one rod rocking on the links of the adjacent rod.

2. A conveyor belt in accordance with claim 1 in which the links are composed of a semi-rigid resilient material and formed in an integral one-piece U-shaped structure to adapt the arms to be spread, snapped over the laterally projecting annular bosses of an adjacent link and returned to their initial shape without permanent deformation to connect the rods into a conveyor belt, and said connected links forming sprocket races between the sleeves and arms at opposite ends of the rods.

References Cited in the file of this patent

UNITED STATES PATENTS

| | | |
|---|---|---|
| 670,285 | Levalley | Mar. 19, 1901 |
| 1,707,088 | Lynch | Mar. 26, 1929 |
| 2,118,736 | Odom | May 24, 1938 |
| 2,553,646 | Field | May 22, 1951 |
| 2,954,113 | Hibbard et al. | Sept. 27, 1960 |

OTHER REFERENCES

Du Pont Production Engineering Bulletin, volume or series 2, May 1955.